United States Patent Office 2,742,457
Patented Apr. 17, 1956

2,742,457

PYRIDO-BENZIMIDAZOL AZO DYES

Bernard Rudner, Baltimore, Md., assignor to General Aniline & Film Corporation, New York, N. Y., a corporation of Delaware No Drawing. Application July 7, 1954,
Serial No. 441,919

6 Claims. (Cl. 260—156)

This invention relates to novel azo dyestuffs of the heterocyclic series.

Condensation in acid media of heterocyclic nitrogen bases containing a 2-aminopyridine nucleus with 1,4-quinones having at least one position ortho to a quinonoid >CO group unsubstituted (e. g. 1,4-benzoquinones and 1,4-naphthoquinones) yields hydroxypyrido-[1,2-a]-benzimidazole compounds.

Thus, as disclosed in Monatshefte 83 (1952), pages 31 to 35, condensation of 2-aminopyridine with 1,4-benzoquinone yields hydroxypyrido-[1,2-a]-benzimidazole having the following formula:

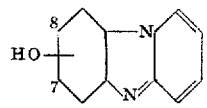

(The hydroxyl group occupies one of the numbered positions.)

I have discovered that the aforesaid hydroxypyrido-[1,2-a]-benzimidazole compounds, having at least one coupling position ortho to the hydroxyl group unsubstituted, couple, preferably in alkaline-to-neutral medium, with diazotized arylamines to yield azo dyestuffs, which are aryl azo bz-hydroxypyrido-[1,2-a]-benzimidazoles, adapted to produce yellow-to-brown-to-blue-to-black shades on textile materials, including cellulosic textiles, nylons, as well as on leather and paper.

The 1,4-quinones from which the coupling components of this invention are obtained can contain nuclear substituents, providing at least one nuclear position ortho to each of the quinonoid carbonyl radicals is unsubstituted. The 2-aminopyridine compound employed in preparing the coupling components of the invention may also contain nuclear substituents (or a fused ring as in 2-aminoquinoline) in addition to the amino group carried by a carbon atom adjacent the pyridine nitrogen atom. Coupling of the hydroxypyrido-[1,2-a]-benzimidazole with the diazotized arylamine occurs in the hydroxy-bearing benzene ring of the coupling component in a position ortho to the hydroxyl group.

My invention will be more readily understood from the following examples wherein parts and percentages are by weight, unless otherwise specified.

Example 1

9.2 parts of hydroxypyrido-[1,2-a]-benzimidazole, produced by acid condensation of 1,4-benzoquinone and 2-amino-pyridine according to the method described in Monatshefte 83, 34 (1952) are added to a solution of 2 parts of caustic soda in 200 parts of water at 10° C. The resulting solution is added over a period of 15 minutes to 30 parts of an aqueous 29.1% paste of 5-diazo-salicylic acid. Sodium carbonate is added in sufficient amount to maintain the pH above 7. The resulting suspension is stirred 18 hours at 20° to 25° C., yielding a clear, dark brown solution. Dilute hydrochloric acid is added to reduce the pH to 7.5–8, whereby a chocolate brown crystalline dyestuff is precipitated having, in the form of its free acid, the following formula:

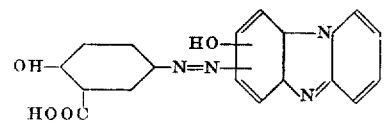

The resulting product dyes wool in yellowish-brown shades, nylon (superpolyamide fiber, e. g. polyhexamethylene adipamide) in bright golden-brown shades, and cellulose acetate fiber and cotton in somewhat lighter brown shades. After-chroming of the dyed fibers causes deepening of the shade, the yellowish appearance being diminished.

5 parts of the aforesaid dyestuff and 10 parts of aqueous chromium formate paste (containing 10–13% $Cr_2O_3$) are heated in 258 parts of aqueous 5% sulfuric acid for 5 hours at 85° to 95° C. A chocolate colored powder is obtained which dyes wool a full brown shade and leaves cellulose acetate fiber unstained. The resulting dyeings are of exceptional fastness to light and washing.

Example 2

The process of Example 1 is repeated, except that instead of 21.6 parts of 1,4-benzoquinone, there are employed 24.4 parts (i. e., an equivalent amount) of 1,4-toluquinone.

The dyestuff thereby obtained, following the procedure of Example 1, has, in its free acid form, the following formula:

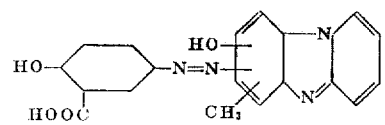

The shades produced by this product on the materials indicated in Example 1, are in each case somewhat more reddish in color than those obtained with the dyestuff of Example 1.

Example 3

9.2 parts of hydroxypyrido-[1,2-a]-benzimidazole, prepared as described in Example 1, are suspended in 200 parts of water containing 2 parts of caustic soda. 28 parts of an aqueous 56.4% paste of nitro-1-diazo-2-naphthol-4-sulfo acid are added to the mixture. The resulting dyestuff is isolated as described in Example 1, and recovered in the form of a dark semi-crystalline powder. Its formula, in free acid form, is as follows:

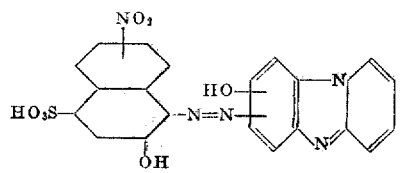

When applied to wool, this product yields a red-brown shade, which, on after-chroming, becomes deeper, the red tinge being appreciably diminished. When pre-chromed, as described in Example 1, a dark brown semi-crystalline solid is obtained which colors paper a strong brown shade. Such pre-chromed dyestuff shows only slight affinity for wool.

Example 4

The process of Example 3 is repeated, except that in preparing the coupling component, 10.8 parts of 2-amino- 4-methylpyridine are employed instead of 9.4 parts of 2-aminopyridine. The dyestuff thus obtained is similar to that of Example 3 and has, in the form of its free acid, the following formula:

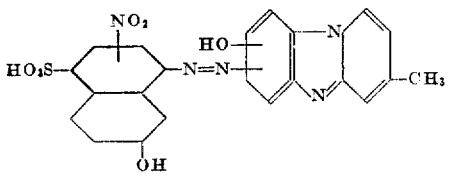

The properties of this dyestuff are similar to those of the product of Example 3.

Example 5

9.2 parts of hydroxypyrido-[1,2-a]-benzimidazole are added to a solution of 2 parts of caustic soda in 200 parts of water, and a solution of 8.6 parts of tetrazotized dianisidine in 150 parts of water, neutralized to Congo Red, are added to the coupling component mixture over a period of 1 hour while maintaining a temperature of 5° to 10° C. After agitating for 24 hours at 20° to 25° C., the dark precipitate is filtered out, washed with aqueous 2% caustic soda, water, and then alcohol. The resulting black solid has the following formula:

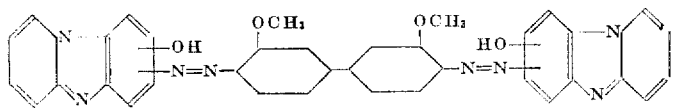

This product dyes cotton directly in bluish-black shades, and when printed on cotton, yields strong fast blue-black prints.

Example 6

The stable diazoamino compound obtained by reaction of diazotized cresidine with sarcosine is applied, together with hydroxypyrido-[1,2-a]-benzimidazole, in an aqueous printing paste of cotton. On ageing the print with steam containing acetic acid vapor (which liberates diazotized cresidine for coupling), a yellow-brown print is obtained of which the dyestuff has the following formula:

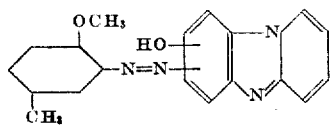

The coupling components employed for preparation of the azo dyestuffs of this invention are the condensation products of 1,4-quinones having at least one nuclear position ortho to each of the quinonoid carbonyl groups unsubstituted, with α-aminopyridines, α-aminobenzopyridines, and their nuclear substitution products. The resulting condensation products, which are the coupling components of this invention, are pyrido-[1,2-a]-benzimidazole compounds (i. e., compounds including the nuclear configuration of pyrido-[1,2-a]-benzimidazole) in which an OH group is substituted in the benzene ring of the benzimidazole residue, and a position ortho to the hydroxyl group is unsubstituted.

Nuclear substituents present in other positions of the aforesaid coupling components can be lower alkyl (e. g. methyl, ethyl, propyl, isopropyl, n-butyl, 2-butyl, isobutyl), halogen (e. g. chlorine, bromine), hydroxy, acyloxy (e. g. acetoxy, benzoyloxy), lower alkoxy (e. g. methoxy, ethocy, hydroxyethoxy, isopropoxy, butoxy), acyl (acetyl, butyryl, benzoyl), sulfonic acid, sulfonamide, carboxy acid, carboxy (e. g. carboxymethyl), carboamide, cyano and nitro groups.

The following 1,4-quinones can be employed in the preparation of the coupling components of the invention:

1,4-benzoquinone
1,4-toluquinone
1,4-naphthoquinone
2-chloro-1,4-benzoquinone
2,5-dichloro-1,4-benzoquinone
1,4-benzoquinone carboxy acid methyl ester
1,4-benzoquinone sulfo acid
2-acetoxy-1,4-benzoquinone
2-methoxy-1,4-benzoquinone In combination with the foregoing quinones, the following 2-aminopyridines or 2-aminobenzopyridines can be condensed to produce the coupling components employed for the azo dyestuffs of the invention:

2-aminopyridine
3,5-dichloro-2-aminopyridine
2-aminoquinoline
6-chloro-2-aminoquinoline
2-amino-8-methoxyquinoline
6-chloro-2-aminopyridine-4-carboxy acid
2-aminopyridine-5-sulfo acid
2-amino-3-methylpyridine
2-amino-4-methylpyridine Preparation of the coupling component by condensation of one of the foregoing quinolines with one of the foregoing aminopyridines can be carried out as directed in Example 1 by mixing in glacial acetic acid solution.

In preparing the azo dyestuffs of this invention, the diazo compounds which are reacted with the aforesaid hydroxypyrido-[1,2-a]-benzimidazole compounds can be one of those conventionally employed in the preparation of azo dyestuffs. Thus, they include diazotized monocyclic and polycyclic primary arylamines and polyamines, e. g. of the benzene, naphthalene, anthracene, and biphenyl series. The diazotized amine can be applied for coupling as such as well as in stabilized form (e. g. a stable diazonium salt, or diazoamino compound).

Coupling is advantageously effected in alkaline-to-neutral aqueous medium for preparation of the dyestuff in substance and prints can be developed in the case of mixtures of the coupling components with stable diazoamino compounds by ageing the mixture on the goods with acids.

The dyestuffs and dyeings produced with the azo compounds of this invention can be pre-chromed or after-chromed to increase the depth of shade and fastness properties.

Variations and modifications, which will be obvious to those skilled in the art, can be made in the foregoing examples without departing from the scope or spirit of the invention.

I claim:

1. An arylazo - bz - hydroxypyrido - [1,2-a]-benzimidazole, in which the aryl radical is selected from the class consisting of radicals of the benzene and naphthalene series.

2. Bz - [m - carboxy - p - hydroxy - benzene-azo] - bz-hydroxypyrido-[1,2-a]-benzimidazole.

3. Bz-[m-carboxy - p - hydroxy - benzene - azo]-bz-hydroxy-bz-methylpyrido-[1,2-a]-benzimidazole.

4. Nitro - 2' - hydroxy - 4' - sulfonaphthalene - 1' - azo-bz-hydroxypyrido-[1,2-a]-benzimidazole.

5. Nitro - 2' - hydroxy - 4' - sulfonaphthalene - 1' - azo-bz-hydroxy-3-methylpyrido-[1,2-a]-benzimidazole.

6. 3,3' - dimethoxy - biphenyl - 4,4' - bis - (azo - bz-hydroxypyrido-[1,2-a]-benzimidazole).

References Cited in the file of this patent
UNITED STATES PATENTS 2,432,419   Heimbach _____ Dec. 9, 1947

UNITED STATES PATENT OFFICE
CERTIFICATION OF CORRECTION

Patent No. 2,742,457                                          April 17, 1956

Bernard Rudner

It is hereby certified that error appears in the above numbered patent requiring correction and that the said Letters Patent should read as corrected below.

Column 2, lines 35 to 39, the formula should appear as shown below instead of as in the patent:

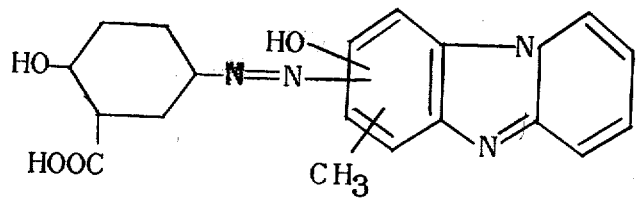

column 3, line 41, for "of" read -- to --.

Signed and sealed this 2nd day of May 1961.

(SEAL)
Attest:

ERNEST W. SWIDER
Attesting Officer

DAVID L. LADD
                                                 Commissioner of Patents